May 26, 1936. P. W. FASSLER 2,041,913
PORTABLE WELDING MACHINE
Filed May 15, 1935
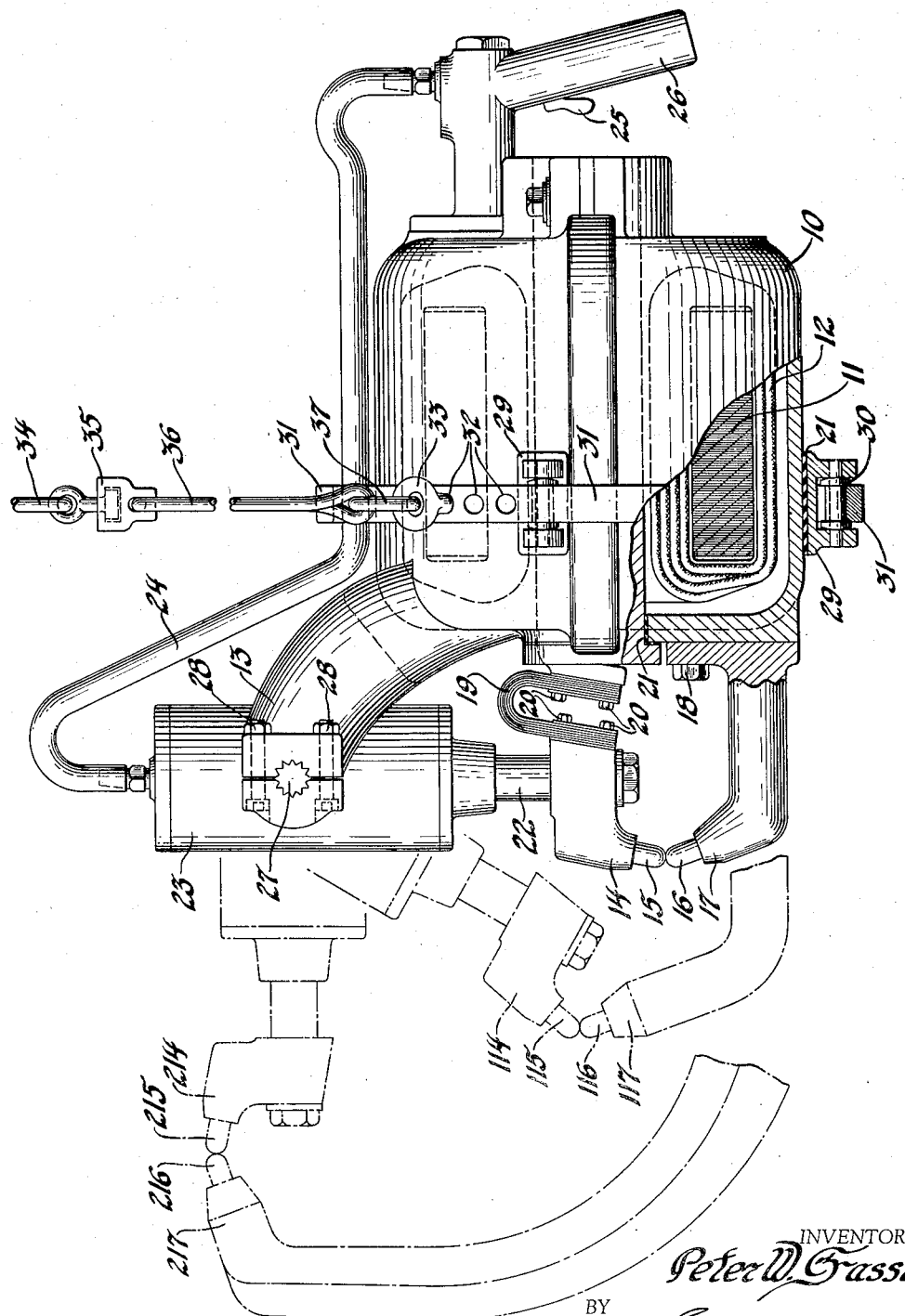
INVENTOR.
Peter W. Fassler
BY
Everett G. Wright.
ATTORNEY.

Patented May 26, 1936

2,041,913

UNITED STATES PATENT OFFICE 2,041,913

PORTABLE WELDING MACHINE

Peter W. Fassler, Detroit, Mich.

Application May 15, 1935, Serial No. 21,513

4 Claims. (Cl. 219—4)

This invention relates to portable welding machines and in particular to the mounting of the machine and its electrodes.

It has been customary to build standard portable welding machines adapted to perform the ordinary class of work and to build special machines to reach work which would be inaccessible for welding with the standard machines.

A large number of portable welding machines are used on assembly lines in the manufacture of automobiles, automobile bodies and like articles having parts inaccessible for welding by standard welding machines; these portable welders are built special for each operation. It has been necessary for manufacturers to discard standard and/or special portable welders or have them rebuilt to fit or reach work that would be inaccessible to standard welding machines or machines built for a particular purpose when changes are made in production.

Because of the fact that portable welders are usually too heavy for one man to use continuously without fatigue, it is necessary to suspend the welders near the work and have them constructed so as to be placed in the desired position for welding the work with a minimum of manual effort. The means for suspending the welder taken in combination with the adaptibility of its electrodes to work in practically all positions is an important factor in the efficiency and economy of welding during the assembly of numerous articles of manufacture.

One object of this invention is to provide a portable welding machine in which the movable electrode thereof is capable of being adjusted to cooperate with interchangeable stationary electrodes to permit said machine to be accessible for welding work from a plurality of directions.

Another object of this invention is to provide a portable welding machine suspended for pivoting and rotation in which the movable electrode thereof is capable of being adjusted to cooperate with interchangeable stationary electrodes to permit said machine to be accessible for welding work from a plurality of directions.

Another object of this invention is to provide a portable welding machine suspended for pivoting and rotation which, taken in combination with its swingably adjustable movable electrode and cooperating interchangeable electrodes, will engage work at any angle between 0 and 90 degrees above or below the angle to which the normal horizontal axis of suspension thereof may be pivoted.

Another object of this invention is to provide a portable welding machine adjustably suspended for pivoting and rotation which, taken in combination with its adjustable movable electrode and cooperating interchangeable stationary electrodes, will engage work, for example, at and from any angle between 135 degrees above and below the normal horizontal axis of suspension thereof when pivoting the same not to exceed 45 degrees above and below the said normal horizontal axis of suspension thereof.

Another object of this invention is to provide a portable welding machine pivotally suspended above its horizontal center of gravity approximately at its longitudinal center of gravity and rotatably mounted within said pivotal mounting for ease in manipulating the same into welding position to work to be welded thereby, the pivotal mounting being so located as to permit the welding machine to automatically return to its horizontal axis after being pivoted.

Other objects of this invention will become apparent by reference to the following detailed description taken in connection with the accompanying drawing, in which:

The single figure is a side view, part in elevation and part in section, showing a portable welding machine embodying this invention.

Referring particularly to the drawing wherein like numerals refer to like and corresponding parts throughout the single view, the embodiment of the portable welding machine shown therein comprises a main body portion 10 which, when using a transformer of the type disclosed and claimed in Patent No. 1,986,884 issued to Peter W. Fassler on January 8, 1935, also serves as the secondary winding thereof. The core 11 and primary winding 12 of the transformer is preferably located within the main body portion 10 of the welding machine.

A bifurcated bracket 13 which may be integral with the main body portion 10 of the welding machine is preferably cantilevered forward and above the same for swingably supporting the movable electrode holder 14 carrying the movable electrode 15. A cooperating stationary electrode 16 is carried by an interchangeable stationary electrode holder 17 removably secured to the main body portion 10 of the welding machine by any suitable means such as the bolts 18. The movable electrode holder 14 and the movable electrode 15 may be collectively referred to as an electrode or a movable electrode, likewise, the cooperating stationary electrode 16 and the interchangeable stationary electrode holder 17 may be collectively referred to as the other of a pair of electrodes.

Inasmuch as the main body portion 10 serves as the secondary winding of the transformer, the movable electrode 15 is electrically connected thereto by means of the flexible lead 19 secured by suitable bolts 20 to one current carrying pad of the transformer secondary and to the movable electrode holder 14; also the stationary electrode 16 is electrically connected thereto by means of bolting the stationary electrode holder 17 directly to the other current carrying pad of the transformer by the bolts 18 as heretofore mentioned. The parts of the secondary winding which may be identical with the main body portion 10 of the portable welding machine are suitably secured together but are maintained in insulated relation to each other as indicated by the insulation 21 and fully described in the aforementioned Patent No. 1,986,884.

The connection of the primary winding 12 to a source of alternating current, a cooling system for the electrodes, connections to a source of compressed air for operating the movable electrode, and means for causing current to flow through the welding machine have not been shown or described in detail since these features are well known to those skilled in or familiar with the art. However, the movable electrode holder 14 is rigidly mounted on a plunger 22 of an air cylinder 23 which moves the said electrode holder 14 and movable electrode 15 into welding engagement with work to be welded and the stationary electrode 16. Compressed air for operating the cylinder 23 is preferably intermittently supplied thereto through the air hose 24 and controlled by the manipulation of the trigger 25 on the operating handle 26.

The bifurcated bracket 13 is provided with means for swingably supporting the air cylinder 23 at any desired position by engaging diametrically opposed notched or splined trunnions 27 preferably integral with the said air cylinder 23 with the cooperating notched or splined split ends of the said bifurcated bracket 13 and securing the same in the said engaged position by means of the bolts 28.

By swingably supporting the said air cylinder 23 at any desired position on its swingable axis, the movable electrode holder 14 and the movable electrode 15 may be maintained in any desired number of adjusted positions two of which being illustrated in the drawing and particularly designated by the numerals 114, 214, 115 and 215 respectively. The cooperating stationary electrode 16 and the interchangeable stationary electrode holder 17 removably secured to the main body portion 10 of the welding machine are interchanged to cooperate with the adjusted positions 115 and 215 of the movable electrode 15 as illustrated in the drawing by interchangeable stationary electrodes 116 and 216 and the interchangeable stationary electrode holders 117 and 217 respectively.

The main body portion 10 of the welding machine is provided with three or more brackets 29 secured thereto in suitably spaced relation to each other around the said main body portion 10 at approximately the longitudinal center of gravity of the welding machine. When the main body portion 10 of the welding machine serves as a housing and secondary winding of the welding transformer, it is necessary to insulate the brackets 29 from the said main body portion 10 as indicated by the insulation generally designated by the numeral 21 in the drawing.

The brackets 29 are each provided with suitable anti-friction rollers 30 which cooperate with an annular track or ring 31 within which the welding machine is thereby rotatably mounted.

The upper half of the annular track or ring 31 is preferably provided with a plurality of tapped holes 32 into which the eye-bolts 33 may be threadedly secured at the desired distance above the horizontal center of gravity of the welding machine. When in use, the welding machine is usually suspended from a trolley by means of a tension windlass, not shown, and a flexible cable 34 secured to a swivel 35 connected to a bail 36 from which the said welding machine is pivotally suspended by the links 37 cooperating with the eye-bolts 33. The closer the eye-bolts 33 are placed to the horizontal center of gravity of the welding machine the less manual effort is required to pivot the same, however, inasmuch as the eye-bolts 33 are always above the said horizontal center of gravity, the welding machine is constantly urged by gravity to its normal horizontal position indicated in drawing.

Quick acting adjustment means for moving and securing the swingable support for the movable electrode 15 may be used instead of the illustrative embodiment shown in the drawing in cooperation with suitable quick clamping means for securing the interchangeable holder 17 of the stationary electrode 16. The aforementioned quick acting and quick clamping means are highly desirable when a rapid change in the position of electrodes is required.

It will be obvious that various changes may be made in the arrangement, combination and construction of my improvement in portable welding machines without departing from the spirit of my invention, and it is intended to cover in the claims such changes as may be reasonably included within the scope thereof.

I claim:

1. In a portable welding machine, a main body portion, a pair of electrodes one of which is movable, and means for swingably supporting one of said electrodes about an axis fixed with respect to the main body portion, the other of said electrodes being removably secured to the main body portion and being replaceable by like electrodes of different length and conformation whereby to permit said welder to accommodate different angular positions of said swingable electrode with respect to the main body portion.

2. In a portable welding machine, a main body portion, a rotatable mounting for said welding machine located substantially at its longitudinal center of gravity, adjustable pivotal suspension means secured thereto above the horizontal center of gravity thereof, a pair of electrodes one of which is movable, and means for swingably supporting said movable electrode about an axis fixed with respect to the main body portion, the other of said electrodes being removably secured to the main body portion and being replaceable by like electrodes of different length and conformation whereby to permit said welder to accommodate different angular positions of said swingable electrode with respect to the main body portion.

3. In a portable welding machine, a main body portion, an annular mounting for said welding machine located substantially at its longitudinal center of gravity, a pivotal suspension means cooperating with said annular mounting adjustably secured thereto above the horizontal center of gravity thereof, a pair of electrodes one of which is movable, an air cylinder adapted to bring said movable electrode into operative relationship with work to be welded and the other electrode, a bifurcated bracket integral with said main body portion for swingably supporting said air cylinder, the other of said electrodes being removably secured to said main body portion and being interchangeable with like electrodes of different length and conformation whereby to permit said welder to accommodate different angular positions of said movable electrodes with respect to the main body portion.

4. In a portable welding machine, a main body portion, an annular mounting for said welding machine located substantially at its longitudinal center of gravity, a pivotal suspension means cooperating with said annular mounting adjustably secured thereto above the horizontal center of gravity thereof, a pair of electrodes one of which is movable, an air cylinder adapted to bring said movable electrode into operative relationship with work to be welded and the other electrode, a bifurcated bracket integral with said main body portion for swingably supporting said air cylinder forward of the longitudinal center of gravity and above the horizontal center of gravity of the said main body portion, the other of said electrodes being removably secured to said main body portion and being interchangeable with like electrodes of different length and conformation whereby to permit said welder to accommodate different angular positions of said movable electrodes with respect to the main body portion.

PETER W. FASSLER.